(12) United States Patent
Wan et al.

(10) Patent No.: US 11,205,169 B2
(45) Date of Patent: Dec. 21, 2021

(54) DEVICE, COMBINATION OF DEVICES, SYSTEM, AND METHOD FOR PAYING TRANSPORTATION FARES

(71) Applicant: Advanced New Technologies Co., Ltd., Grand Cayman (KY)

(72) Inventors: Xuyang Wan, Hangzhou (CN); Huanmi Yin, Hangzhou (CN); Hong Zhang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/085,877

(22) Filed: Oct. 30, 2020

(65) Prior Publication Data

US 2021/0049584 A1 Feb. 18, 2021

Related U.S. Application Data

(63) Continuation of application No. PCT/CN2019/097540, filed on Jul. 24, 2019.

(30) Foreign Application Priority Data

Aug. 31, 2018 (CN) .......................... 201811015703.6

(51) Int. Cl.
*G06Q 20/32* (2012.01)
*G06K 7/10* (2006.01)
(Continued)

(52) U.S. Cl.
CPC ..... *G06Q 20/3278* (2013.01); *G06K 7/10297* (2013.01); *G06Q 20/3227* (2013.01);
(Continued)

(58) Field of Classification Search
CPC ........... G06Q 20/3278; G06Q 20/3227; G06Q 20/4037; G06Q 20/405; G06Q 40/02;
(Continued)

(56) References Cited

U.S. PATENT DOCUMENTS

2013/0060647 A1* 3/2013 Aabye ................... G06Q 20/32
705/16
2014/0019216 A1* 1/2014 Jo ........................ G06Q 20/145
705/13
(Continued)

FOREIGN PATENT DOCUMENTS

CN 103473853 12/2013
CN 105096109 11/2015
(Continued)

OTHER PUBLICATIONS

Balaban, Dan, "NFC The Future Of Mobile Payment?: Pilots of mobile ticketing and payment are proliferating using phones with NFC chips. But before the rollouts begin, backerswill have to answer some key questions, including: What is the business case?", Card Technology, 11.7: 24, SourceMedia, Inc., Sep. 2006.*
(Continued)

*Primary Examiner* — Nathan Erb
(74) *Attorney, Agent, or Firm* — Fish & Richardson P.C.

(57) ABSTRACT

Disclosed herein are methods, systems, and apparatus, including computer programs encoded on computer storage media, for paying transportation fare. One of the methods includes: communicating to a toll terminal based on near field communication (NFC) technology, for paying a fare of using a transport system associated with the toll terminal; deducting, through a user account, the fare from an account balance associated with the user account; recording a remaining account balance associated with the user account after the fare is deducted; determining that the remaining account balance is less than a predetermined threshold; and providing the remaining account balance to a second mobile device over the NFC in response to determining that the remaining account balance is less than a predetermined
(Continued)

threshold to trigger a request from the second mobile device to a transaction server to add balance to the user account.

18 Claims, 6 Drawing Sheets

(51) Int. Cl.
*G06Q 20/40* (2012.01)
*G06Q 40/02* (2012.01)
*G06Q 50/30* (2012.01)
*G07B 15/06* (2011.01)

(52) U.S. Cl.
CPC ....... *G06Q 20/405* (2013.01); *G06Q 20/4037* (2013.01); *G06Q 40/02* (2013.01); *G06Q 50/30* (2013.01); *G07B 15/06* (2013.01); *G06Q 2240/00* (2013.01)

(58) Field of Classification Search
CPC ............... G06Q 50/30; G06Q 2240/00; G06K 7/10297; G07B 15/06
See application file for complete search history.

(56) References Cited

U.S. PATENT DOCUMENTS

| | | | | |
|---|---|---|---|---|
| 2014/0046737 | A1* | 2/2014 | Graves | G06Q 20/4037 705/13 |
| 2015/0294210 | A1* | 10/2015 | Cortina | G06K 19/0723 235/492 |
| 2015/0324763 | A1* | 11/2015 | Akashika | G06Q 20/3278 705/41 |
| 2017/0186246 | A1* | 6/2017 | Montealegre | G07B 15/06 |
| 2017/0372295 | A1* | 12/2017 | Zhu | G06Q 20/3278 |
| 2018/0068313 | A1* | 3/2018 | Van Os | G06Q 20/36 |

FOREIGN PATENT DOCUMENTS

| | | |
|---|---|---|
| CN | 105654286 | 6/2016 |
| CN | 106067115 | 11/2016 |
| CN | 106408294 | 2/2017 |
| CN | 106682894 | 5/2017 |
| CN | 206209867 | 5/2017 |
| CN | 107833041 | 3/2018 |
| CN | 107944857 | 4/2018 |
| CN | 109285001 | 1/2019 |
| TW | 201234295 | 8/2012 |
| TW | 201520920 | 6/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

PCT International Search Report and Written Opinion in International Application No. PCT/CN2019/097540, dated Oct. 30, 2019, 9 pages (with partial English translation).

* cited by examiner

DEVICE, COMBINATION OF DEVICES, SYSTEM, AND METHOD FOR PAYING TRANSPORTATION FARES

CROSS-REFERENCE TO RELATED APPLICATIONS

This application is a continuation of PCT Application No. PCT/CN2019/097540, filed on Jul. 24, 2019, which claims priority to Chinese Patent Application No. 201811015703.6, filed on Aug. 31, 2018, and each application is hereby incorporated by reference in its entirety.

TECHNICAL FIELD

The present application relates to the field of payment technologies, and in particular, to devices, combinations of devices, systems, and methods for paying transportation fares.

BACKGROUND

When taking a subway, a bus, etc., people need to pay corresponding transportation fares. Currently, ever-increasing users begin to use mobile phones and other devices instead of conventional transportation cards to pay transportation fares. For example, transportation fares can be paid through near field communication (NFC), range-controlled communication (RCC), or two-dimensional codes.

If a user wants to pay transportation fares by scanning a two-dimensional code, when taking a bus or entering a station, the user needs to enable a corresponding application and perform a switchover to a page to identify the corresponding two-dimensional code, which is troublesome. If a user wants to pay transportation fares through NFC or RCC, the user needs to perform recharging in advance. Therefore, it is complex to operate either method.

Therefore, it is necessary to provide a solution that makes it easier for users to pay transportation fares.

SUMMARY

Embodiments of the present specification are intended to provide devices, combinations of devices, systems, and methods for paying transportation fares. A transportation fares payment module performs near field communication with a transportation charging terminal, performs a transportation fares deduction operation for a user with the transportation charging terminal, and records a transportation fares amount of the user obtained after the transportation fares are deducted; and a recharging module performs near field communication with the transportation fares payment module to read the transportation fares amount recorded by the transportation fares payment module, and automatically sends a recharging request to a transaction server when the transportation fares amount is less than a specified threshold. By using the device provided in the embodiments of the present specification, automatic recharging of transportation fares is implemented by detecting the transportation fares amount recorded by the transportation fares payment module, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

To alleviate the previous technical problem, the embodiments of the present specification are implemented as follows:

Embodiments of the present specification provide a device for paying transportation fares, including a recharging module and a transportation fares payment module, where the transportation fares payment module is configured to store transportation fares amount of a user, perform a transportation fares deduction operation for the user with a transportation charging terminal when performing near field communication with the transportation charging terminal, and record a transportation fares amount of the user obtained after transportation fares are deducted; and the recharging module is configured to perform near field communication with the transportation fares payment module to read the transportation fares amount recorded by the transportation fares payment module, and send a recharging request to a transaction server when the transportation fares amount is less than a specified threshold.

Embodiments of the present specification further provide a combination of devices for paying transportation fares, including a recharging device and a transportation fares payment device, where the recharging device includes a recharging module, and the transportation fares payment device includes a transportation fares payment module; the transportation fares payment module is configured to store a transportation fares amount of a user, perform a transportation fares deduction operation for the user with a transportation charging terminal when performing near field communication with the transportation charging terminal, and record a transportation fares amount of the user obtained after transportation fares are deducted; and the recharging module is configured to perform near field communication with the transportation fares payment module to read the transportation fares amount recorded by the transportation fares payment module, and send a recharging request to a transaction server when the transportation fares amount is less than a specified threshold.

Embodiments of the present specification further provide a system for paying transportation fares, including a transaction server and a device for paying transportation fares, where the device for paying transportation fares is configured to store a transportation fares amount of a user, perform a transportation fares deduction operation for the user with a transportation charging terminal when performing near field communication with the transportation charging terminal, and record a transportation fares amount of the user obtained after transportation fares are deducted, and is further configured to send a recharging request to the transaction server when the transportation fares amount recorded by the device for paying transportation fares is less than a specified threshold; and the transaction server is configured to receive the recharging request sent by the device for paying transportation fares, and perform a recharging operation for the recharging request.

Embodiments of the present specification further provide a system for paying transportation fares, including a transaction server, a recharging device, and a transportation fares payment device, where the transportation fares payment device is configured to store a transportation fares amount of a user, perform a transportation fares deduction operation for the user with a transportation charging terminal when performing near field communication with the transportation charging terminal, and record a transportation fares amount of the user obtained after transportation fares are deducted; the recharging device is configured to perform near field communication with the transportation fares payment device to read the transportation fares amount recorded by the transportation fares payment device, and send a recharging request to the transaction server when the transportation fares amount is less than a specified threshold; and the transaction server is configured to receive the recharging request sent by the recharging device, and perform a recharging operation for the recharging request.

Embodiments of the present specification further provide a method for paying transportation fares, where the method includes: performing, by a transportation fares payment module, near field communication with a transportation charging terminal, and performing a transportation fares deduction operation for a user with the transportation charging terminal, where the transportation fares payment module stores a transportation fares amount of the user; recording, by the transportation fares payment module, a transportation fares amount of the user obtained after transportation fares are deducted; and performing, by a recharging module, near field communication with the transportation fares payment module to read the transportation fares amount recorded by the transportation fares payment module, and sending a recharging request to a transaction server when the transportation fares amount is less than a specified threshold.

In the technical solutions of the embodiments, the transportation fares payment module performs near field communication with the transportation charging terminal, performs the transportation fares deduction operation for the user with the transportation charging terminal, and records the transportation fares amount of the user obtained after the transportation fares are deducted; and the recharging module performs near field communication with the transportation fares payment module to read the transportation fares amount recorded by the transportation fares payment module, and automatically sends the recharging request to the transaction server when the transportation fares amount is less than the specified threshold. By using the device provided in some embodiments of the present specification, automatic recharging of transportation fares is implemented by detecting the transportation fares amount recorded by the transportation fares payment module, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present application. A person of ordinary skill in the art can further derive other drawings from these accompanying drawings without creative efforts.

DESCRIPTION OF EMBODIMENTS

To make a person skilled in the art better understand the technical solutions in the present application, the following clearly and comprehensively describes the technical solutions in the embodiments of the present specification with reference to the accompanying drawings in the embodiments of the present specification. Clearly, the described embodiments are merely some but not all of the embodiments of the present application. All other embodiments obtained by a person of ordinary skill in the art based on the embodiments of the present application without creative efforts shall fall within the protection scope of the present application.

The idea of the embodiments of the present specification is to implement automatic recharging by detecting a transportation fares amount recorded by a transportation fares payment module. As such, after a user initiates a transaction, when the transportation fares amount is insufficient, automatic recharging can be implemented. Therefore, the user does not need to manually perform recharging in advance, and an easy operation is implemented. Based on this idea, the embodiments of the present specification provide devices, combinations of devices, systems, and methods for paying transportation fares, which are described below one by one in detail.

Embodiment 1

Some embodiments of the present specification provide a device for paying transportation fares. The device can be an intelligent mobile terminal such as a mobile phone or a tablet computer.

Figure 1:
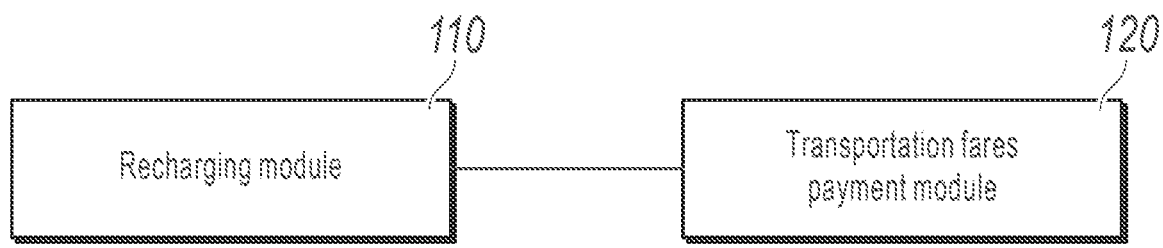
FIG. 1 is a first schematic structural diagram of a device for paying transportation fares, according to Embodiment 1 of the present specification.

FIG. 1 is a first schematic structural diagram of the device for paying transportation fares, according to some embodiments of the present specification. The device shown in FIG. 1 includes a recharging module 110 and a transportation fares payment module 120.

The transportation fares payment module 120 is configured to store a transportation fares amount of a user, perform a transportation fares deduction operation for the user with a transportation charging terminal when performing near field communication with the transportation charging terminal, and record a transportation fares amount of the user obtained after transportation fares are deducted.

The recharging module 110 is configured to perform near field communication with the transportation fares payment module 120 to read the transportation fares amount recorded by the transportation fares payment module 120, and send a recharging request to a transaction server when the transportation fares amount is less than a specified threshold.

The transportation fares can be fares for taking public transportation such as a subway or a bus.

In a specific application scenario, the transportation charging terminal can be a point of sales terminal (POS) disposed at a bus or subway station. When taking a bus, a subway, or other transportation, the user enables the device for paying transportation fares to approach the POS. The device for paying transportation fares and the POS can perform near field communication through NFC or RCC, to implement data exchange between the transportation fares payment module 120 and the POS and complete the transportation fares deduction operation.

In an example, the user takes a subway. When entering the station, the user can enable the device for paying transportation fares to approach the POS. In this case, the POS can read the transportation fares amount recorded by the transportation fares payment module 120 in the device for paying transportation fares. If the transportation fares amount is greater than or equal to a specific threshold, the user is allowed to enter the station, and entrance information of the user is recorded. When leaving the station, the user enables the device for paying transportation fares to approach the POS. In this case, the POS sends a deduction instruction to the transportation fares payment module 120, where the instruction includes a deduction amount. After receiving the deduction instruction, the transportation fares payment module 120 performs a deduction operation to complete the transaction between the POS and the transportation fares payment module 120.

Specifically, after each transaction, the transportation fares payment module 120 needs to record a transportation fares amount obtained after the current transaction.

In addition, it is worthwhile to note that in some embodiments of the present specification, the user is allowed to enter the station when the transportation fares amount recorded by the transportation fares payment module 120 is greater than or equal to the specific threshold. A specific value of the threshold can be set through negotiation with a subway authority. For example, the threshold can be 0. That is, the user is allowed to enter the station provided that the transportation fares amount recorded by the transportation fares payment module 120 is a positive number. Certainly, this is merely an example, and constitutes no limitation on the specific value of the threshold.

In some embodiments of the present specification, to implement automatic recharging, the recharging module 110 performs near field communication with the transportation fares payment module to read the transportation fares amount recorded by the transportation fares payment module 120, detects whether the amount is less than the specified threshold, and performs an automatic recharging operation if the amount is less than the specified threshold.

Specifically, the specified threshold can be a minimum amount that allows the user to enter a station or take public transportation. For example, the specified threshold can be any value such as 0 or 3. Specifically, a specific value of the specified threshold can be set based on an actual application scenario, and is not limited in some embodiments of the present specification.

In some embodiments of the present specification, the recharging module 110 is applied to a recharging application in the device, and a trigger condition for the recharging module 110 to perform near field communication with the transportation fares payment module to read the transportation fares amount recorded by the transportation fares payment module includes any one of the following conditions: the transportation fares payment module 120 performs a transportation fares deduction operation; the recharging application is enabled; and a current moment reaches a specified moment at which the transportation fares amount recorded by the transportation fares payment module 120 is read.

In specific embodiments, after it is detected that the transportation fares payment module 120 performs a transportation fares deduction operation, the recharging module 110 performs near field communication with the transportation fares payment module 120 to read the transportation fares amount recorded by the transportation fares payment module.

Specifically, the transportation fares payment module 120 can proactively send the transportation fares amount currently recorded by the transportation fares payment module 120 to the recharging module each time after the transportation fares deduction operation is performed. Alternatively, the transportation fares payment module 120 can send notification information to the recharging module 110 after performing the transportation fares deduction operation, so that the recharging module 110 reads the transportation fares amount recorded by the transportation fares payment module 120.

If the trigger condition is that the recharging application is enabled, in specific embodiments, when the user enables the recharging application, the recharging module 110 in the recharging application is triggered to perform near field communication with the transportation fares payment module 120 to read the transportation fares amount recorded by the transportation fares payment module 120, detects whether the transportation fares amount is less than the specified threshold, and automatically sends the recharging request to the transaction server if the transportation fares amount is less than the specified threshold.

In some implementations, the user only needs to perform the operation of enabling the recharging application to complete automatic recharging, and does not need to perform additional recharging operations, which is easy and convenient.

In addition, in some embodiments of the present specification, near field communication can be automatically performed with the transportation fares payment module 120 based on a specified time interval to read the transportation fares amount recorded by the transportation fares payment module 120. When a specific time is reached, near field communication is automatically performed with the transportation fares payment module 120 to read the transportation fares amount recorded by the transportation fares payment module 120. For example, near field communication can be automatically performed with the transportation fares payment module 120 every five hours, every day, or every two days, or at a specific moment. For example, at 3 p.m. of each day, near field communication is automatically performed with the transportation fares payment module 120 to read the transportation fares amount recorded by the transportation fares payment module 120.

In addition, in some implementations, the device for paying transportation fares provided in some embodiments of the present specification further includes a detection module. The detection module can perform near field communication with the transportation fares payment module based on a specified time interval to read the transportation fares amount recorded by the transportation fares payment module 120, and detect whether the transportation fares amount is less than the specified threshold. If the transportation fares amount is less than the specified threshold, the recharging application is triggered to be enabled, and the recharging module 110 sends the recharging request to the transaction server.

The detection module can be a software program integrated in hardware of the device for paying transportation fares, and only needs to have reading and comparing functions.

In some implementations, the detection module detects the transportation fares amount recorded by the transportation fares payment module 120 to automatically trigger the recharging application to be enabled. As such, the user does not need to enable the recharging application, recharging automation is implemented, the operation is further simplified, and more convenience is brought to the user.

Figure 2:
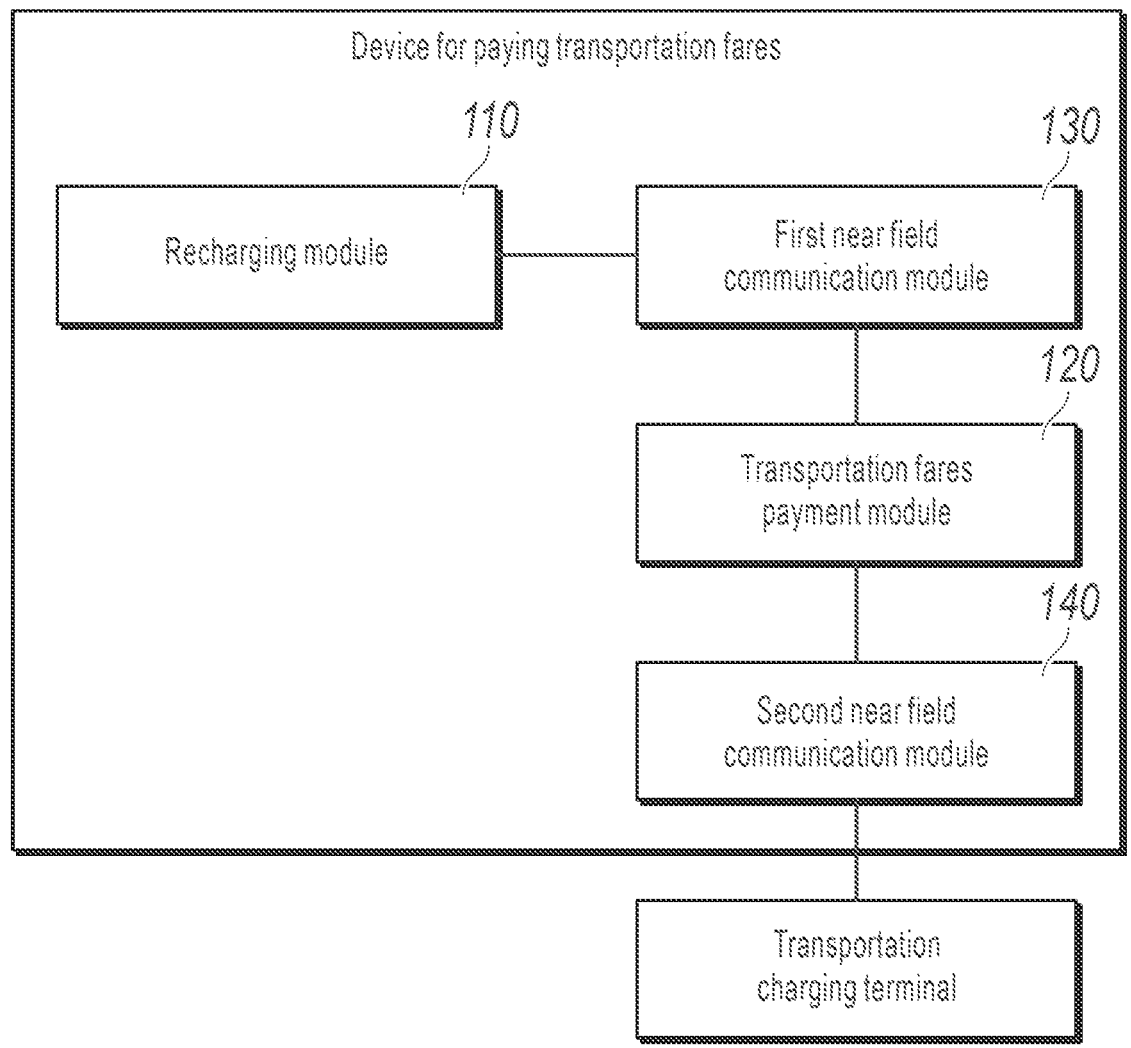
FIG. 2 is a second schematic structural diagram of a device for paying transportation fares, according to Embodiment 1 of the present specification.

In addition, in some embodiments of the present specification, the device for paying transportation fares further includes a first near field communication module 130 and a second near field communication module 140, as shown in FIG. 2.

The transportation fares payment module 120 is configured to perform near field communication with the recharging module 110 by using the first near field communication module 130, and perform near field communication with the transportation charging terminal by using the second near field communication module 140.

Specifically, the first near field communication module 130 is configured to complete communication between the transportation fares payment module 120 and the recharging module 110; and the second near field communication module 140 is configured to complete communication between the transportation fares payment module 120 and the transportation charging terminal.

In NFC, the first near field communication module 130 can be a serial peripheral interface (SPI), an inter-integrated circuit (I2C) bus, a universal asynchronous receiver/transmitter (UART), a single wire protocol (SWP) interface, etc., and the second near field communication module can be various payment protocols of 13.56 MHz.

In RCC, the first near field communication module 130 can be Bluetooth low energy (BLE), and the second near field communication module 140 can be a magnetic induction payment protocol+2.4 GHz.

In addition, in some embodiments of the present specification, the transportation fares payment module 120 can be a secure element (SE) chip.

Specifically, in some embodiments of the present specification, after the recharging module 110 sends the recharging request to the transaction server, the transaction server performs a recharging operation for the received recharging request, and sends a transportation fares amount of the user after recharging to the recharging module 110.

Specifically, to enable the transaction server to perform the recharging operation, the recharging request needs to include information such as a recharging amount, an account to be recharged, and the transportation fares amount recorded by the transportation fares payment module 120 in the device for paying transportation fares.

For ease of understanding, the following provides description by using an example.

For example, in some specific implementations, the transportation fares amount currently recorded by the transportation fares payment module 120 in the device A (hereinafter referred to as device A) for paying transportation fares is −0.5 RMB (owes 0.5 RMB), and it is set by the user in the recharging application that 20 RMB is added through recharging each time. In this case, the recharging request sent by the recharging module 110 to the server includes the recharging amount of 20 RMB, the current transportation fares amount of −0.5 RMB, and a user account corresponding to device A. After the server completes the recharging operation, the transportation fares amount of the user after recharging in device A is 19.5 RMB, and the server sends the transportation fares amount to the recharging module 110 in device A.

In some embodiments of the present specification, the recharging module 110 is further configured to: obtain the transportation fares amount of the user after recharging from the transaction server, and send the transportation fares amount of the user after recharging to the transportation fares payment module 120 by using the first near field communication module 130, so that the transportation fares payment module 120 updates the transportation fares amount recorded by the transportation fares payment module 120.

The transportation fares payment module 120 can update the transportation fares amount by replacing the currently recorded transportation fares amount with the transportation fares amount of the user after recharging.

The recharging module 110 can obtain the transportation fares amount of the user after recharging from the transaction server in the following way: The recharging module 110 proactively queries the transaction server to obtain the transportation fares amount of the user after recharging, or the recharging module 110 receives the transportation fares amount of the user after recharging sent by the transaction server.

For example, in the previous example, the recharging module 110 sends the transportation fares amount of 19.5 RMB of the user after recharging to the transportation fares payment module 120, and the transportation fares payment module 120 updates the currently recorded transportation fares amount to 19.5 RMB.

In some embodiments of the present specification, after recharging, the transportation fares amount recorded by the transportation fares payment module 120 is updated, so that the user can normally execute the next transaction.

To help the transaction server collect statistics on transactions executed by each device for paying transportation fares, in some embodiments of the present specification, the transportation fares payment module 120 is further configured to record transaction information between the transportation fares payment module and the transportation charging terminal, and send the transaction information to the recharging module 110 by using the first near field communication module.

The recharging module 110 is further configured to receive, by using the first near field communication module, the transaction information sent by the transportation fares payment module 120, and upload the transaction information to the transaction server.

Specifically, the transaction information can include information such as a transaction time and a transaction amount. In specific embodiment, each time the transportation fares payment module 120 performs the transportation fares deduction operation, transaction information of the deduction operation in this time is sent to the recharging module 110 by using the first near field communication module 130.

The transaction server stores transaction information and recharging information of each device for paying transportation fares.

In some embodiments of the present specification, to enable the user to directly execute a transaction after card opening, after the user opens a card, the transaction server can predetermine an amount as an initial amount of the transportation fares payment module 120. Specifically, a value of the amount needs to reach a minimum value that can ensure a normal transaction. For example, the user can normally execute a transaction if a balance in the transportation fares payment module 120 is a positive value. In this case, the predetermined amount can be 0.01 RMB. Certainly, this is merely an example, and constitutes no limitation on some embodiments of the present specification.

According to the device for paying transportation fares provided in some embodiments of the present specification, the transportation fares payment module performs near field communication with the transportation charging terminal, performs the transportation fares deduction operation for the user with the transportation charging terminal, and records the transportation fares amount of the user obtained after the transportation fares are deducted; and the recharging module performs near field communication with the transportation fares payment module to read the transportation fares amount recorded by the transportation fares payment module, and automatically sends the recharging request to the transaction server when the transportation fares amount is less than the specified threshold. By using the device provided in some embodiments of the present specification, automatic recharging of transportation fares is implemented by detecting the transportation fares amount recorded by the transportation fares payment module, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

Embodiment 2

Figure 3:
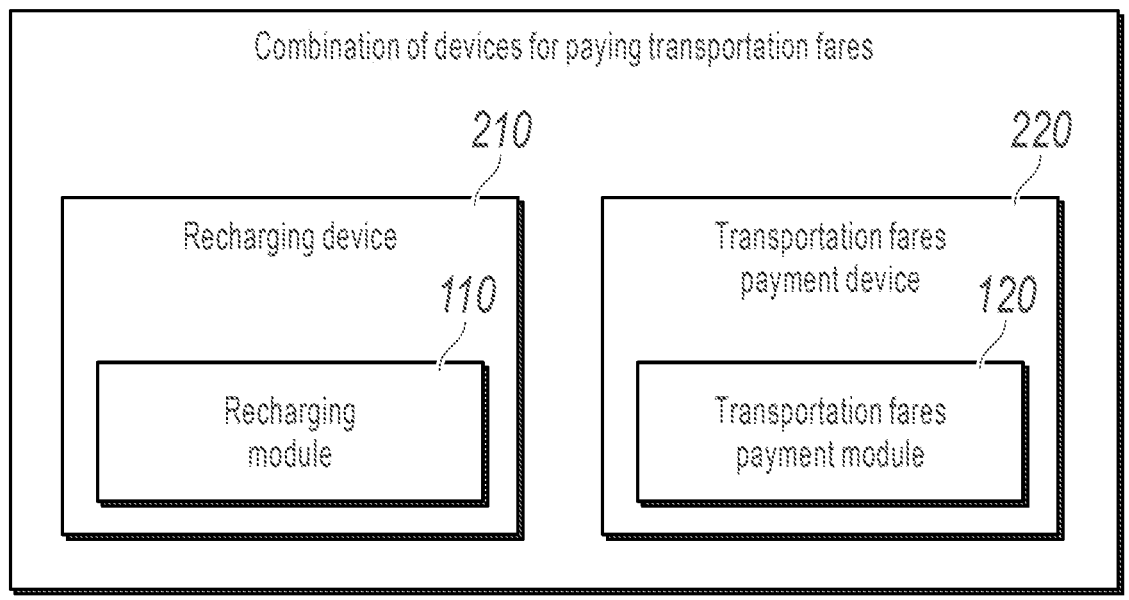
FIG. 3 is a first schematic structural diagram of a combination of devices for paying transportation fares, according to Embodiment 2 of the present specification.

Some embodiments of the present specification provide a combination of devices for paying transportation fares. FIG. 3 is a first schematic structural diagram of the combination of payment devices, according to some embodiments of the specification. Differences from the device for paying transportation fares provided in Embodiment 1 are mainly described here. For the same parts, references can be made to Embodiment 1, and details are omitted here for simplicity. The device shown in FIG. 3 includes a recharging device 210 and a transportation fares payment device 220. The recharging device 210 includes a recharging module 110, and the transportation fares payment device 220 includes a transportation fares payment module 120.

The transportation fares payment module 120 is configured to store a transportation fares amount of a user, perform a transportation fares deduction operation for the user with a transportation charging terminal when performing near field communication with the transportation charging terminal, and record a transportation fares amount of the user obtained after transportation fares are deducted.

The recharging module 110 is configured to perform near field communication with the transportation fares payment module to read the transportation fares amount recorded by the transportation fares payment module, and send a recharging request to a transaction server when the transportation fares amount is less than a specified threshold.

In specific embodiments, the recharging device 210 can be an intelligent terminal such as a mobile phone or a tablet computer, and the transportation fares payment device 220 can be a wristband, etc.

Figure 4:
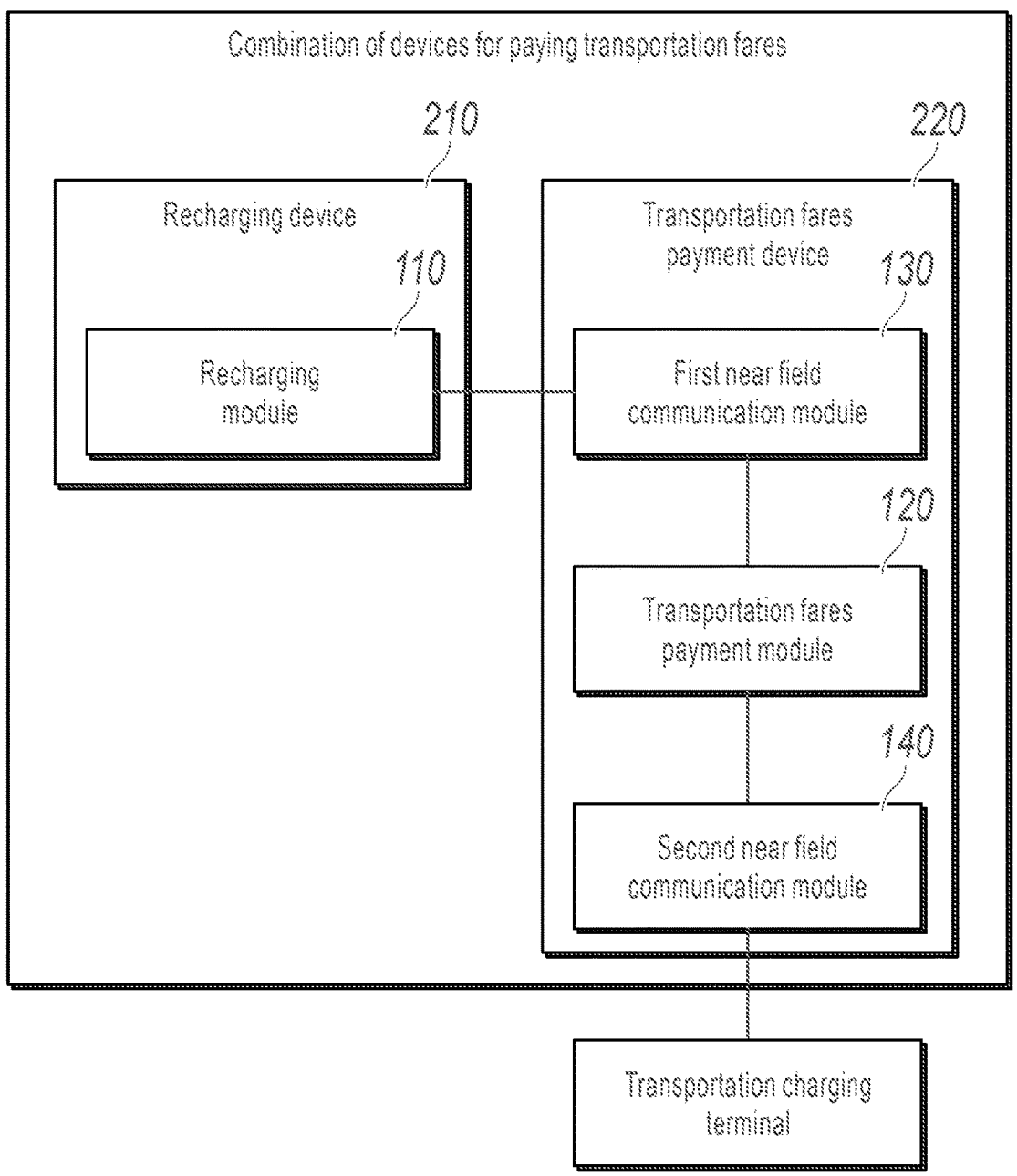
FIG. 4 is a second schematic structural diagram of a combination of devices for paying transportation fares, according to Embodiment 2 of the present specification.

To implement near field communication between the transportation fares payment module 120 and the transportation charging terminal and near field communication between the transportation fares payment module 120 and the recharging module 110, in some embodiments of the present specification, the transportation fares payment device 220 further includes a first near field communication module 130 and a second near field communication module 140, as shown in FIG. 4.

The transportation fares payment module 120 is configured to perform near field communication with the recharging module 110 by using the first near field communication module 130, and perform near field communication with the transportation charging terminal by using the second near field communication module 140.

The recharging module 110 is applied to a recharging application in the recharging device 210.

A trigger condition for the recharging module 110 to perform near field communication with the transportation fares payment module 120 to read the transportation fares amount recorded by the transportation fares payment module 120 includes any one of the following conditions: the transportation fares payment module 120 performs a transportation fares deduction operation; the recharging application is enabled; and a current moment reaches a specified moment at which the transportation fares amount recorded by the transportation fares payment module 120 is read.

In specific embodiments, the recharging device or the transportation fares payment device further includes a detection module.

The detection module is configured to perform near field communication with the transportation fares payment module 120 by using the first near field communication module 130 to read the transportation fares amount recorded by the transportation fares payment module, and detect whether the transportation fares amount is less than the specified threshold. If the transportation fares amount is less than the specified threshold, the recharging application is triggered to be enabled, and the recharging module sends the recharging request to the transaction server.

Specifically, the recharging module 110 is further configured to: obtain a transportation fares amount of the user after recharging from the transaction server, and send the transportation fares amount of the user after recharging to the transportation fares payment module by using the first near field communication module, so that the transportation fares payment module updates the transportation fares amount recorded by the transportation fares payment module.

Specifically, the transportation fares payment module 120 is further configured to record transaction information between the transportation fares payment module and the transportation charging terminal, and send the transaction information to the recharging module 110 by using the first near field communication module 130.

The recharging module 110 is further configured to receive, by using the first near field communication module 130, the transaction information sent by the transportation fares payment module, and upload the transaction information to the transaction server.

It is worthwhile to note that in the combination of devices for paying transportation fares provided in some embodiments of the present specification, specific embodiment processes of functions corresponding to the modules are the same as the specific embodiment processes of the functions corresponding to the modules in Embodiment 1. Therefore, for the specific embodiment processes of the functions corresponding to the modules, references can be made to Embodiment 1, and details are omitted here for simplicity.

According to the combination of payment devices provided in some embodiments of the present specification, the transportation fares payment module performs near field communication with the transportation charging terminal, performs the transportation fares deduction operation for the user with the transportation charging terminal, and records the transportation fares amount of the user obtained after the transportation fares are deducted; and the recharging module performs near field communication with the transportation fares payment module to read the transportation fares amount recorded by the transportation fares payment module, and automatically sends the recharging request to the transaction server when the transportation fares amount is less than the specified threshold. By using the device provided in some embodiments of the present specification, automatic recharging of transportation fares is implemented by detecting the transportation fares amount recorded by the transportation fares payment module, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

Embodiment 3

Figure 5:
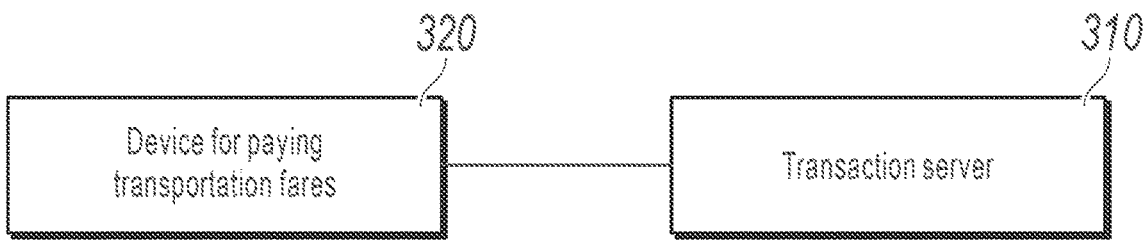
FIG. 5 is a first schematic structural diagram of a system for paying transportation fares, according to Embodiment 3 of the present specification.

Based on the device for paying transportation fares provided in Embodiment 1 of the present specification, some embodiments of the present specification further provide a system for paying transportation fares. FIG. 5 is a first schematic structural diagram of the system for paying transportation fares, according to some embodiments of the present specification. The system for paying transportation fares shown in FIG. 5 includes a transaction server 310 and the device 320 for paying transportation fares provided in Embodiment 1 of the present specification.

The device 320 for paying transportation fares is configured to store a transportation fares amount of a user, perform a transportation fares deduction operation for the user with a transportation charging terminal when performing near field communication with the transportation charging terminal, record a transportation fares amount of the user obtained after transportation fares are deducted, and send a recharging request to the transaction server when the transportation fares amount recorded by the device for paying transportation fares is less than a specified threshold.

The transaction server 310 is configured to receive the recharging request sent by the device 320 for paying transportation fares, and perform a recharging operation for the recharging request.

The transportation charging terminal can be a POS.

For ease of understanding, the following provides description by using an example in which the transaction is subway fares.

When needing to enter the station, the user enables the device for paying transportation fares to approach the transportation charging terminal. In this case, the transportation charging terminal reads the transportation fares amount recorded by the device for paying transportation fares, and determines whether the transportation fares amount is greater than or equal to a specified value. If the transportation fares amount is greater than or equal to the specified value, the user is allowed to enter the station. Otherwise, a prompt message indicating that the transportation fares amount is insufficient is sent.

When leaving the station, the user enables the device 320 for paying transportation fares to approach the transportation charging terminal again. In this case, the transportation charging terminal performs near field communication with the device 320 for paying transportation fares, and sends a deduction instruction to the device 320 for paying transportation fares, where the deduction instruction includes a deduction amount. When receiving the deduction instruction sent by the transportation charging terminal, the device 320 for paying transportation fares performs a deduction operation, and records the transportation fares amount.

The device for paying transportation fares automatically performs a recharging operation when the transportation fares amount recorded by the device for paying transportation fares is less than the specified threshold.

Specifically, the device 320 for paying transportation fares is further configured to: obtain a transportation fares amount of the user after recharging from the transaction server, and update the transportation fares amount recorded by the device for paying transportation fares to the transportation fares amount of the user after recharging.

The device 320 for paying transportation fares is further configured to: record transaction information between the device for paying transportation fares and the transportation charging terminal, and upload the transaction information to the transaction server.

For specific embodiment processes of functions corresponding to the transportation charging terminal, the device 320 for paying transportation fares, and the transaction server 310, references can be made to the embodiment of the payment device, and details are omitted here for simplicity.

In addition, the system provided in some embodiments of the present specification further includes a settlement server.

The settlement server is configured to receive transaction information periodically uploaded by the transportation charging terminal, and is further configured to receive recharging information of the user sent by the transaction server, and perform assets settlement based on the transaction information and the recharging information. The transaction information includes at least a time of each transaction, address information of each transaction, and an amount of each transaction.

Figure 6:
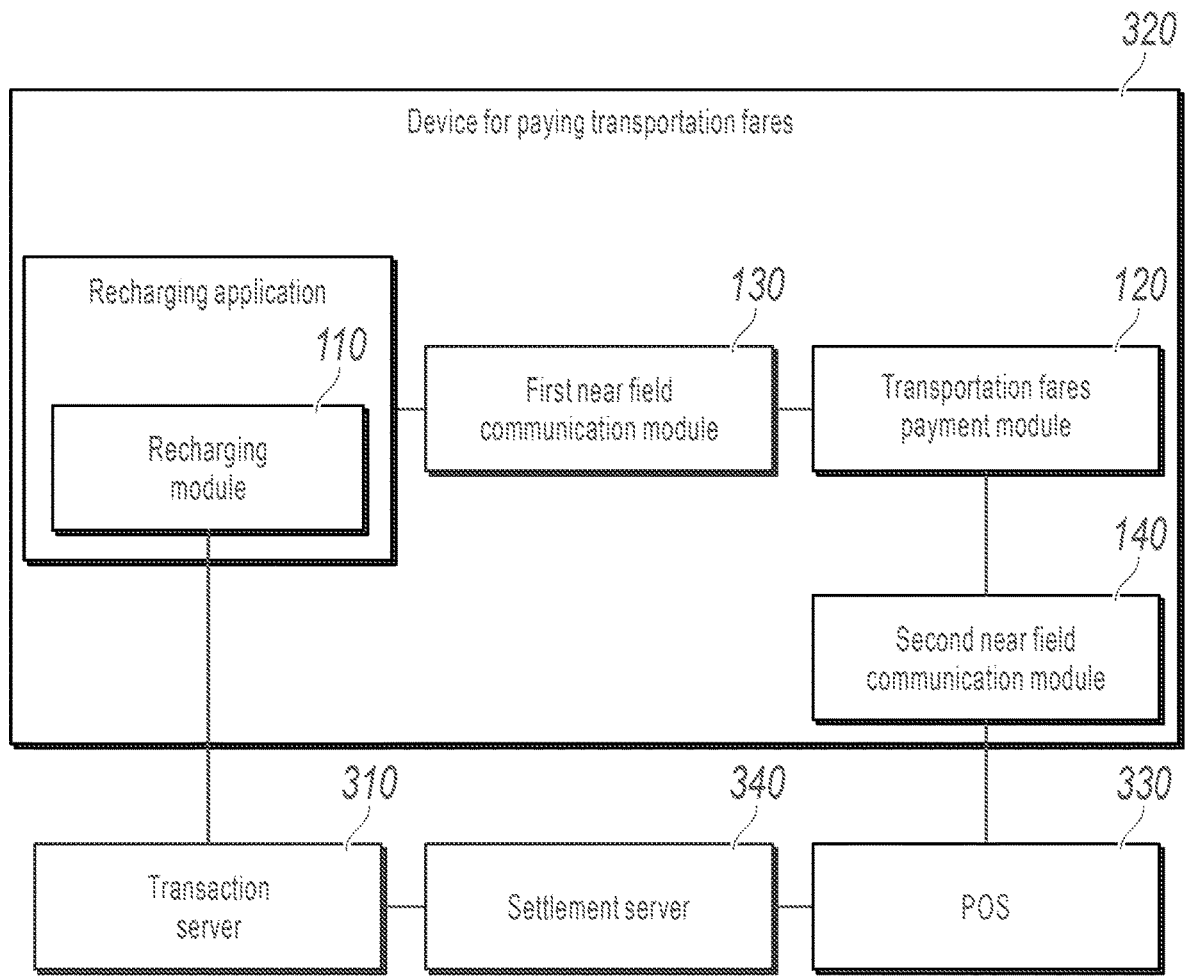
FIG. 6 is a second schematic structural diagram of a system for paying transportation fares, according to Embodiment 3 of the present specification.

FIG. 6 is a second schematic structural diagram of the system for paying transportation fares, according to some embodiments of the present specification. The system shown in FIG. 6 includes a transaction server 310, a device 320 for paying transportation fares, a POS 330, and a settlement server 340.

The device 320 for paying transportation fares includes a recharging module 110 disposed in a recharging application, a transportation fares payment module 120, a first near field communication module 130, and a second near field communication module 140.

In a specific application scenario, when needing to enter the station to take a subway, the user enables the device 320 for paying transportation fares to approach the POS 330. In this case, the POS 330 reads the transportation fares amount currently recorded by the transportation fares payment module 120 by using the second near field communication module 140, and determines whether the read transportation fares amount is greater than or equal to a specified value. If the transportation fares amount is greater than or equal to the specified value, the user is allowed to enter the station to take a subway.

When leaving the subway station, the user enables the device 320 for paying transportation fares to approach the POS 330 again. In this case, the POS 330 sends a deduction instruction to the device 320 for paying transportation fares, where the deduction instruction includes a deduction amount. Specifically, the POS 330 sends the deduction instruction to the transportation fares payment module 120 in the device 320 for paying transportation fares by using the second near field communication module 140, and the transportation fares payment module 120 performs a deduction operation based on the deduction instruction, and records a transportation fares amount obtained after the deduction operation is performed.

When the user enables the recharging application in the device for paying transportation fares, the recharging module 110 is triggered to read, by using the first near field communication module 130, the transportation fares amount recorded by the transportation fares payment module 120, determines whether the transportation fares amount is less than the specified threshold, and automatically sends the recharging request to the transaction server 310 if the transportation fares amount is less than the specified threshold. The recharging request includes a recharging amount, an account to be recharged, and the current transportation fares amount.

After receiving the recharging request sent by the recharging module 110, the transaction server 310 performs a recharging operation, and sends a transportation fares amount after recharging to the recharging module 110, so that the recharging module 110 sends the transportation fares amount after recharging to the transportation fares payment module 120 by using the first near field communication module 130, and the transportation fares payment module 120 updates the currently recorded transportation fares amount to the transportation fares amount of the user after recharging.

In addition, in some embodiments, the transportation fares payment module 120 further records transaction information of each transaction between the transportation fares payment module the POS 330, where the transaction information includes a transaction time and a transaction amount, and sends the transaction information to the recharging module 110 by using the first near field communication module 130, and the recharging module 110 sends the transaction information to the transaction server 310.

In addition, the POS 330 also records transaction information between the POS 330 and each transportation fares payment module 120, where the transaction information includes information such as a transaction place, a transaction amount, and a transaction time, and sends the transaction information to the settlement server 340 based on a specified period. The settlement server 340 obtains recharging information of the user from the transaction server 310, and performs transaction settlement based on the recharging information and the transaction information.

According to the payment system provided in some embodiments of the present specification, the device for paying transportation fares performs near field communication with the transportation charging terminal, performs the transportation fares deduction operation for the user with the transportation charging terminal, and records the transportation fares amount obtained after deduction; and the device for paying transportation fares automatically sends the recharging request to the transaction server when detecting that the transportation fares amount recorded by the device for paying transportation fares is less than the specified threshold. By using the device provided in some embodiments of the present specification, automatic recharging of transportation fares is implemented by detecting the transportation fares amount recorded by the device for paying transportation fares, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

Embodiment 4

Figure 7:
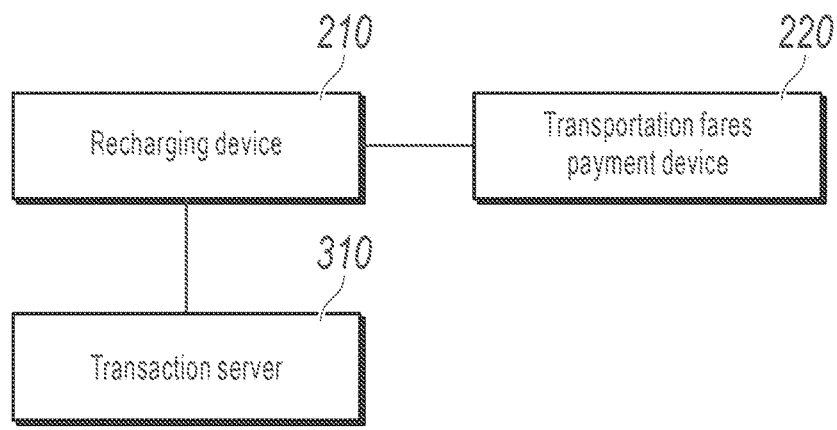
FIG. 7 is a schematic structural diagram of a system for paying transportation fares, according to Embodiment 4 of the present specification.

Based on the combination of devices for paying transportation fares provided in Embodiment 2 of the present specification, some embodiments of the present specification further provide a system for paying transportation fares. FIG. 7 is a schematic structural diagram of the system for paying transportation fares, according to some embodiments of the present specification. The system for paying transportation fares shown in FIG. 7 includes a transaction server 310, a recharging device 210, and a transportation fares payment device 220.

The transportation fares payment device 220 is configured to store a transportation fares amount of a user, perform a transportation fares deduction operation for the user with a transportation charging terminal when performing near field communication with the transportation charging terminal, and record a transportation fares amount of the user obtained after transportation fares are deducted.

The recharging device 210 is configured to perform near field communication with the transportation fares payment device 220 to read the transportation fares amount recorded by the transportation fares payment device, and send a recharging request to the transaction server when the transportation fares amount is less than a specified threshold.

The transaction server 310 is configured to receive the recharging request sent by the recharging device 210, and perform a recharging operation for the recharging request.

To implement near field communication between the transportation fares payment device 220 and each of the transportation charging terminal and the recharging device 210, some embodiments of the present specification, the transportation fares payment device 220 further includes a first near field communication module and a second near field communication module.

The transportation fares payment device 220 is configured to perform near field communication with the recharging device 210 by using the first near field communication module, and perform near field communication with the transportation charging terminal by using the second near field communication module.

Specifically, the recharging device 210 includes a recharging module 110. The recharging module 110 is applied to a recharging application in the recharging device 210. Specifically, the recharging module 110 performs near field communication with the transportation fares payment device 220 to read the transportation fares amount recorded by the transportation fares payment device. Correspondingly, a trigger condition for the recharging module 110 to perform near field communication with the transportation fares payment device 220 to read the transportation fares amount recorded by the transportation fares payment device includes any one of the following conditions: the transportation fares payment device performs a transportation fares deduction operation; the recharging application is enabled; and a current moment reaches a specified moment at which the transportation fares amount recorded by the transportation fares payment device is read.

Specifically, the recharging module 110 is further configured to: obtain a transportation fares amount of the user after recharging from the transaction server, and send the transportation fares amount of the user after recharging to the transportation fares payment device 220 by using the first near field communication module, so that the transportation fares payment device 220 updates the transportation fares amount recorded by the transportation fares payment device.

Specifically, the transportation fares payment device 220 is further configured to record transaction information between the transportation fares payment device and the transportation charging terminal, and send the transaction information to the recharging module 110 by using the first near field communication module.

The recharging module 110 is further configured to receive, by using the first near field communication module, the transaction information sent by the transportation fares payment device, and upload the transaction information to the transaction server.

The transportation fares payment device 220 includes a transportation fares payment module. For specific embodiment processes of functions corresponding to the recharging module, the recharging device, the transportation fares payment device, the transportation fares payment module, and the transaction server 310, references can be made to Embodiment 2, and details are omitted here for simplicity.

In addition, the system provided in some embodiments of the present specification further includes a settlement server.

The settlement server is configured to receive transaction information periodically uploaded by the transportation charging terminal, and is further configured to receive recharging information of the user sent by the transaction server, and perform settlement based on the transaction information and the recharging information. The transaction information includes at least a time of each transaction, address information of each transaction, and an amount of each transaction.

Specifically, specific functions of the devices and modules in the system for paying transportation fares provided in some embodiments of the present specification are the same as the functions of the modules and devices described in Embodiment 1, Embodiment 2, and Embodiment 3. Therefore, for the specific functions of the devices and modules in some embodiments of the present specification, references can be made to Embodiment 1, Embodiment 2, and Embodiment 3, and details are omitted here for simplicity.

According to the system for paying transportation fares provided in some embodiments of the present specification, the transportation fares payment device performs near field communication with the transportation charging terminal, performs the transportation fares deduction operation for the user with the transportation charging terminal, and records the transportation fares amount obtained after deduction; and the recharging device performs near field communication with the transportation fares payment device to read the transportation fares amount recorded by the transportation fares payment device, and automatically sends the recharging request to the transaction server when the transportation fares amount is less than the specified threshold. By using the device provided in some embodiments of the present specification, automatic recharging of transportation fares is implemented by detecting the transportation fares amount recorded by the transportation fares payment device, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

Embodiment 5

Figure 8:
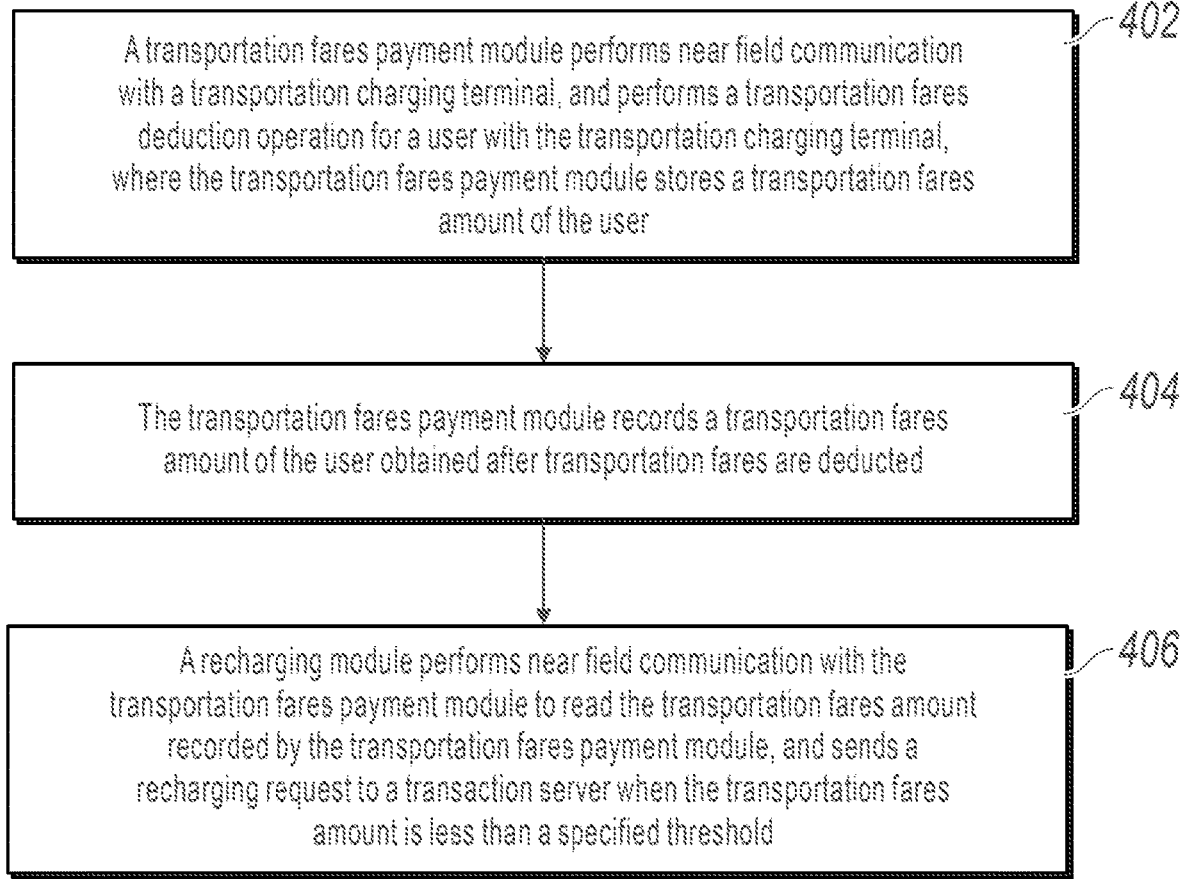
FIG. 8 is a first schematic flowchart illustrating a method for paying transportation fares, according to an embodiment of the present specification.

Corresponding to the device for paying transportation fares and the combination of devices for paying transportation fares provided in the embodiments of the present specification, based on the same idea, the embodiments of the present specification further provide a method for paying transportation fares. FIG. 8 is a first schematic flowchart illustrating the method for paying transportation fares, according to some embodiments of the present specification. The method shown in FIG. 8 includes at least the following steps.

Step 402: A transportation fares payment module performs near field communication with a transportation charging terminal, and performs a transportation fares deduction operation for a user with the transportation charging terminal, where the transportation fares payment module stores a transportation fares amount of the user.

The transportation fares deduction operation for the user performed with the transportation charging terminal can be that the transportation charging terminal sends a deduction instruction to the transportation fares payment module, and the transportation fares payment module performs the transportation fares deduction operation based on the deduction instruction. The deduction instruction includes a deduction amount. The transportation charging terminal can be a POS, etc.

Step 404: The transportation fares payment module records a transportation fares amount of the user obtained after transportation fares are deducted.

Step 406: A recharging module performs near field communication with the transportation fares payment module to read the transportation fares amount recorded by the transportation fares payment module, and sends a recharging request to a transaction server when the transportation fares amount is less than a specified threshold.

Specifically, in some embodiments of the present specification, after the recharging module sends the recharging request to the transaction server, the transaction server performs a recharging operation, and obtains a transportation fares amount of the user after recharging. Therefore, the method provided in some embodiments of the present specification further includes: obtaining, by the recharging module, the transportation fares amount of the user after recharging from the transaction server, and sending the transportation fares amount of the user after recharging to the transportation fares payment module by using a first near field communication module; and updating, by the transportation fares payment module based on the transportation fares amount of the user after recharging, the transportation fares amount recorded by the transportation fares payment module.

The recharging module can obtain the transportation fares amount of the user after recharging from the transaction server in the following way: The recharging module actively obtains the transportation fares amount of the user after recharging, or the recharging module receives the transportation fares amount of the user after recharging returned by the transaction server.

In some embodiments of the present specification, the recharging module is applied to the recharging application in the payment device in Embodiment 1 or the recharging application in the recharging device in Embodiment 2. Before sending the recharging request to the transaction server, the recharging module needs to detect whether the transportation fares amount recorded by the transportation fares payment module is less than the specified threshold, which is specifically implemented in the following way:

When the transportation fares amount recorded by the transportation fares payment module is less than the specified threshold, before the recharging module sends the recharging request to the transaction server, the method further includes: when the recharging application is enabled, the transportation fares payment module performs a transportation fares deduction operation, or a current moment reaches a specified moment, performing, by the recharging module, near field communication with the transportation fares payment module to read the transportation fares amount recorded by the transportation fares payment module, and detecting whether the transportation fares amount is less than the specified threshold.

Specifically, specific embodiment processes of the steps in the method for paying transportation fares provided in some embodiments of the present specification are the same as the embodiment processes of the functions of the modules in Embodiment 1 and Embodiment 2. Therefore, for the specific embodiment processes of the steps, references can be made to Embodiment 1 and Embodiment 2, and details are omitted here for simplicity.

Figure 9:
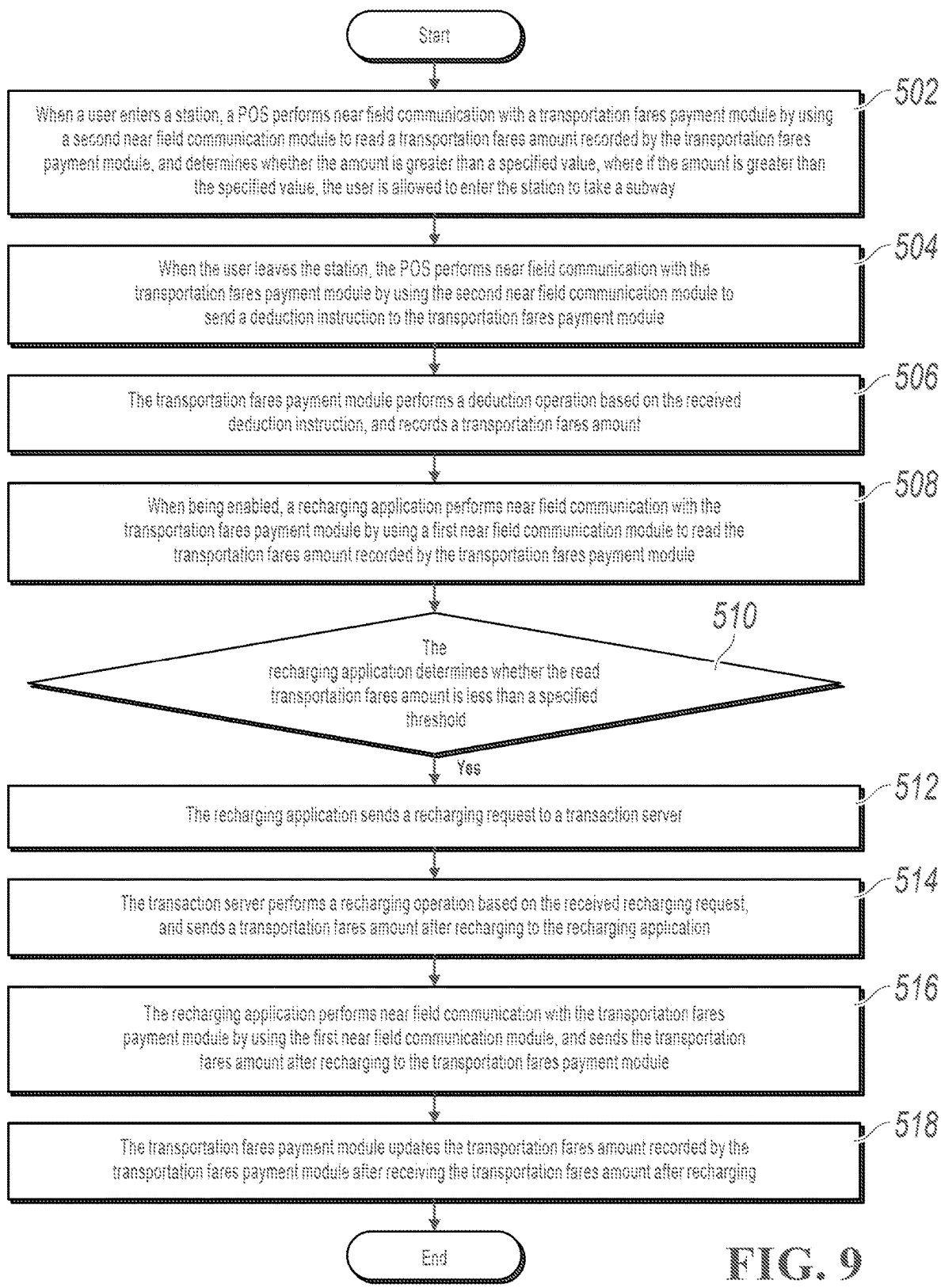
FIG. 9 is a second schematic flowchart illustrating a method for paying transportation fares, according to an embodiment of the present specification.

To facilitate understanding of the method for paying transportation fares provided in some embodiments of the present specification, the following provides description by using an example in which the user takes a subway. FIG. 9 is a second schematic flowchart illustrating the method for paying transportation fares, according to some embodiments of the present specification. The method shown in FIG. 9 includes at least the following steps:

Step 502: When a user enters a station, a POS performs near field communication with a transportation fares payment module by using a second near field communication module to read a transportation fares amount recorded by the transportation fares payment module, and determines whether the transportation fares amount is greater than a specified value, where if the transportation fares amount is greater than the specified value, the user is allowed to enter the station to take a subway.

Step 504: When the user leaves the station, the POS performs near field communication with the transportation fares payment module by using the second near field communication module to send a deduction instruction to the transportation fares payment module.

The deduction instruction includes a deduction amount.

Step 506: The transportation fares payment module performs a deduction operation based on the received deduction instruction, and records a transportation fares amount.

Step 508: When a recharging application is enabled, the recharging application performs near field communication with the transportation fares payment module by using a first near field communication module to read the transportation fares amount recorded by the transportation fares payment module.

Specifically, in step 508, the recharging module disposed in the recharging application can read the transportation fares amount recorded by the transportation fares payment module.

Step 510: The recharging application determines whether the read transportation fares amount is less than a specified threshold, and performs step 512 if the transportation fares amount is less than the specified threshold.

Step 512: The recharging application sends a recharging request to a transaction server.

The recharging request includes information such as a recharging amount, an account to be recharged, and the read transportation fares amount.

Step 514: The transaction server performs a recharging operation based on the received recharging request, and sends a transportation fares amount after recharging to the recharging application.

Step 516: The recharging application performs near field communication with the transportation fares payment module by using the first near field communication module, and sends the transportation fares amount of the user after recharging to the transportation fares payment module.

Step 518: The transportation fares payment module updates the transportation fares amount recorded by the transportation fares payment module after receiving the transportation fares amount after recharging.

According to the payment method provided in some embodiments of the present specification, the transportation fares payment module performs near field communication with the transportation charging terminal, performs the transportation fares deduction operation for the user with the transportation charging terminal, and records the transportation fares amount of the user obtained after the transportation fares are deducted; and the recharging module performs near field communication with the transportation fares payment module to read the transportation fares amount recorded by the transportation fares payment module, and automatically sends the recharging request to the transaction server when the transportation fares amount is less than the specified threshold. By using the device provided in some embodiments of the present specification, automatic recharging of transportation fares is implemented by detecting the transportation fares amount recorded by the transportation fares payment module, which alleviates a case in which inconvenience is brought to the user because the user cannot normally take transportation due to insufficient transportation fares. In addition, the user does not need to manually perform recharging, and the operation is easy and convenient. The transportation fares payment module stores the transportation fares amount of the user, and a transportation fares payment still can be made when a network is not normally connected, which brings great convenience to the user.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

A person skilled in the art should understand that embodiments of the present application can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer-executable instructions executed by a computer, for example, a program module. The program module usually includes a routine, a program, an object, a component, a data structure, etc. for executing a specific task or implementing a specific abstract data type. The present application can be practiced in distributed computing environments. In the distributed computing environments, tasks are executed by remote processing devices that are connected through a communications network. In the distributed computing environment, the program module can be located in both local and remote computer storage media including storage devices.

The embodiments of the present specification are described in a progressive way. For same or similar parts in the embodiments, references can be made to these embodiments, and each embodiment focuses on a difference from other embodiments. Particularly, the system embodiment is basically similar to the method embodiment, and therefore is described briefly. For related parts, references can be made to partial description in the method embodiment.

The previous description is merely embodiments of the present application, and is not intended to limit the present application. For a person skilled in the art, the present application can have various modifications and changes. Any modifications, equivalent replacements, improvements, etc. made within the spirit and the principle of the present application shall fall within the scope of the claims of the present application.

What is claimed is:

1. A computer-implemented method for paying transportation fare, the method comprising:
communicating, by a first mobile device to a toll terminal based on near field communication (NFC) technology, for paying a fare for using a transport system associated with the toll terminal;
deducting, through a user account associated with the first mobile device, the fare from an account balance associated with the user account;
recording, by the first mobile device, a remaining account balance associated with the user account after the fare is deducted;
determining, by the first mobile device, that the remaining account balance is less than a predetermined threshold;
providing, by the first mobile device, the remaining account balance to a second mobile device over the NFC technology in response to determining that the remaining account balance is less than the predetermined threshold to trigger a request from the second mobile device to a transaction server to add a predetermined balance to the user account, wherein the request to the transaction server is automatically triggered by opening an application associated with the user account on the second mobile device, and the predetermined balance is preset through the application; and
providing, by the first mobile device, transactions associated with the user account performed by using the first mobile device to communicate with the second mobile device through the NFC technology, to be forwarded by the second mobile device to a settlement server via the transaction server, wherein the transactions are used by the settlement server in combination with charging information uploaded by the toll terminal to the settlement server.

2. The computer-implemented method according to claim 1, wherein the first mobile device comprises a first NFC module and a second NFC module, and wherein the NFC technology with the toll terminal is performed by using the first NFC module and the NFC technology with the second mobile device is performed by using the second NFC module.

3. The computer-implemented method according to claim 2, wherein the request to the transaction server is further triggered by one or more of the deducting the fare from the account balance, or a predetermined time set for the user account is reached.

4. The computer-implemented method according to claim 1, wherein the NFC technology with the toll terminal is performed by a secure element (SE) chip of the first mobile device, and the account balance is stored in the SE chip.

5. The computer-implemented method according to claim 4, further comprising:
receiving, by the first mobile device through the NFC technology, a new account balance from the second mobile device after the predetermined balance is added to the remaining account balance by the transaction server; and
recording, by the first mobile device, the new account balance to the SE chip.

6. The computer-implemented method according to claim 1, wherein the first mobile device is a wearable device and the second mobile device is a mobile phone.

7. A computer-implemented system for paying transportation fare, comprising:
one or more computers; and
one or more computer memory devices interoperably coupled with the one or more computers and having tangible, non-transitory, machine-readable media storing one or more instructions that, when executed by the one or more computers, perform operations comprising:
communicating with a toll terminal based on near field communication (NFC) technology, for paying a fare for using a transport system associated with the toll terminal;
deducting, through a user account, the fare from an account balance associated with the user account;

recording a remaining account balance associated with the user account after the fare is deducted;
determining that the remaining account balance is less than a predetermined threshold;
providing the remaining account balance to a second mobile device over the NFC technology in response to determining that the remaining account balance is less than the predetermined threshold to trigger a request from the second mobile device to a transaction server to add a predetermined balance to the user account, wherein the request to the transaction server is automatically triggered by opening an application associated with the user account on the second mobile device, and the predetermined balance is preset through the application; and
providing, by the computer-implemented system, transactions associated with the user account performed by using the computer-implemented system to communicate with the second mobile device through the NFC technology, to be forwarded by the second mobile device to a settlement server via the transaction server, wherein the transactions are used by the settlement server in combination with charging information uploaded by the toll terminal to the settlement server.

8. The computer-implemented system according to claim 7, wherein the computer-implemented system comprises a first NFC module and a second NFC module, and wherein the NFC technology with the toll terminal is performed by using the first NFC module and the NFC technology with the second mobile device is performed by using the second NFC module.

9. The computer-implemented system according to claim 8, wherein the request to the transaction server is further triggered by one or more of the deducting the fare from the account balance, or a predetermined time set for the user account is reached.

10. The computer-implemented system according to claim 7, wherein the NFC technology with the toll terminal is performed by a secure element (SE) chip of the computer-implemented system, and the account balance is stored in the SE chip.

11. The computer-implemented system according to claim 10, the operations further comprising:
receiving, by the computer-implemented system through the NFC technology, a new account balance from the second mobile device after the predetermined balance is added to the remaining account balance by the transaction server; and
recording, by the computer-implemented system, the new account balance to the SE chip.

12. The computer-implemented system according to claim 7, wherein the computer-implemented system is a wearable device and the second mobile device is a mobile phone.

13. A non-transitory, computer-readable medium storing one or more instructions thereon, the instructions executable by a computer system to perform operations for paying transportation fare, the operations comprising:
communicating to a toll terminal based on near field communication (NFC) technology, for paying a fare for using a transport system associated with the toll terminal;
deducting, through a user account, the fare from an account balance associated with the user account;
recording a remaining account balance associated with the user account after the fare is deducted;
determining that the remaining account balance is less than a predetermined threshold;
providing the remaining account balance to a second mobile device over the NFC technology in response to determining that the remaining account balance is less than the predetermined threshold to trigger a request from the second mobile device to a transaction server to add a predetermined balance to the user account, wherein the request to the transaction server is automatically triggered by opening an application associated with the user account on the second mobile device, and the predetermined balance is preset through the application; and
providing, by the computer system, transactions associated with the user account performed by using the computer system to communicate with the second mobile device through the NFC technology, to be forwarded by the second mobile device to a settlement server via the transaction server, wherein the transactions are used by the settlement server in combination with charging information uploaded by the toll terminal to the settlement server.

14. The non-transitory, computer-readable medium according to claim 13, wherein the computer system comprises a first NFC module and a second NFC module, and wherein the NFC technology with the toll terminal is performed by using the first NFC module and the NFC technology with the second mobile device is performed by using the second NFC module.

15. The non-transitory, computer-readable medium according to claim 14, wherein the request to the transaction server is further triggered by one or more of the deducting the fare from the account balance, or a predetermined time set for the user account is reached.

16. The non-transitory, computer-readable medium according to claim 13, wherein the NFC technology with the toll terminal is performed by a secure element (SE) chip of the computer system, and the account balance is stored in the SE chip.

17. The non-transitory, computer-readable medium according to claim 16, the operations further comprising:
receiving, by the computer system through the NFC technology, a new account balance from the second mobile device after the predetermined balance is added to the remaining account balance by the transaction server; and
recording, by the computer system, the new account balance to the SE chip.

18. The non-transitory, computer-readable medium according to claim 13, wherein the computer system is a wearable device and the second mobile device is a mobile phone.

* * * * *

UNITED STATES PATENT AND TRADEMARK OFFICE
CERTIFICATE OF CORRECTION

| | | |
|---|---|---|
| PATENT NO. | : 11,205,169 B2 | |
| APPLICATION NO. | : 17/085877 | |
| DATED | : December 21, 2021 | |
| INVENTOR(S) | : Xuyang Wan, Huanmi Yin and Hong Zhang | |

It is certified that error appears in the above-identified patent and that said Letters Patent is hereby corrected as shown below:

On the Title Page

Column 2 (item [56]), Line 3, delete "backerswill" and insert -- backers will --.

Signed and Sealed this
Seventh Day of June, 2022

Katherine Kelly Vidal
*Director of the United States Patent and Trademark Office*